W. H. SHUTER.
AXLE NUT LOCK.
APPLICATION FILED FEB. 27, 1911.

1,010,457.

Patented Dec. 5, 1911.

Witnesses:
J. C. Devick.
George L. Chindahl

Inventor:
William H. Shuter,
By Luther L. Miller
Atty.

COLUMBIA PLANOGRAPH CO., WASHINGTON, D. C.

UNITED STATES PATENT OFFICE.

WILLIAM H. SHUTER, OF MAYWOOD, ILLINOIS.

AXLE-NUT LOCK.

1,010,457. Specification of Letters Patent. Patented Dec. 5, 1911.

Application filed February 27, 1911. Serial No. 611,152.

*To all whom it may concern:*

Be it known that I, WILLIAM H. SHUTER, a citizen of the United States, residing at Maywood, in the county of Cook and State of Illinois, have invented certain new and useful Improvements in Axle-Nut Locks, of which the following is a specification.

This invention relates to means for locking axle nuts, and is particularly applicable to farm and heavy delivery wagons.

An object of the present invention is to provide means which shall not simply prevent the nut from being accidentally rotated off the axle, but which shall also prevent any movement of the nut, since, if the nut is free to move even slightly, the continued pressure of the hub is likely to cause the threads of the nut or the axle to be stripped.

A further object of the invention is to produce an axle-nut lock which may be readily applied to axles having metallic skeins.

Figure 1:
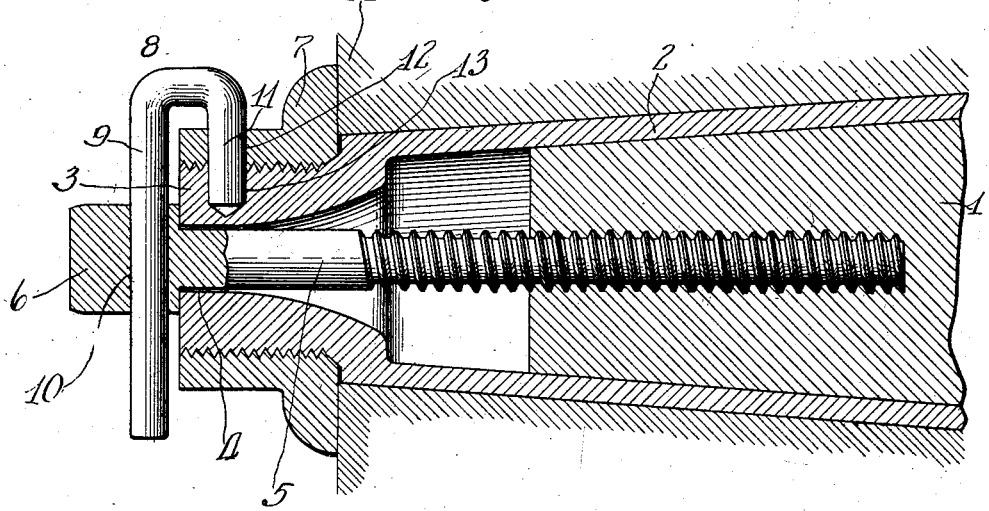
Figure 2:
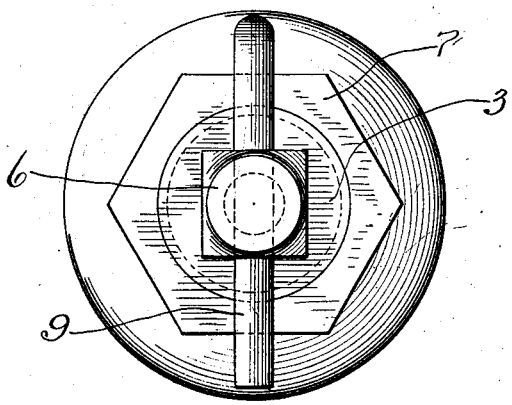

In the accompanying drawings, Figure 1 is a longitudinal, vertical, central section through one end of an axle provided with a nut lock embodying the features of my invention. Fig. 2 is a left-hand end elevation of the parts shown in Fig. 1.

In the drawings, 1 represents the outer end of one member of the axle, which member may, if desired, be made of wood. Fitting upon the member 1 is a skein 2, the outer end 3 of which skein is provided with an opening 4 therethrough to receive a bolt 5. The screw-threaded portion of said bolt engages the member 1, the head of the bolt bearing against the outer end of the portion 3, whereby the skein 2 is secured to the member 1.

7 is a nut turned upon the screw-threaded periphery of the portion 3. To secure the nut 7 in place, I provide a locking staple 8 having legs of unequal length, the longer leg 9 of said staple extending through an opening 10 in the bolt head 6, while the shorter leg 11 extends through registering openings 12 and 13 in the nut 7 and the portion 3, respectively. It will be seen that when the staple 8 occupies the position shown in the drawings, the nut 7 is securely held against any movement whatsoever upon the portion 3 whereby the pressure of the wheel hub 14 is prevented from unscrewing the nut or stripping the threads thereof. To remove the staple 8, the lower end of the leg 9 may be given an upward tap to withdraw the leg 11 from the openings 12 and 13. It will be seen that the single device 8 serves to lock both the axle nut 7 and the bolt 5 against rotation.

I claim as my invention:

1. The combination of an axle having an outer exteriorly-screw-threaded end and an opening in its outer end, a member extending within said opening, a nut turned upon said screw-threaded portion, and a staple, one leg of which extends through registering openings in said nut and said screw-threaded portion, the other leg of said staple extending through an opening in said member.

2. The combination of an axle member, a skein mounted upon said axle member and having an outer exteriorly-screw-threaded end, a bolt extending through said screw-threaded end and engaging said axle member, the head of said bolt bearing against the outer end of said screw-threaded portion, a nut turned upon said screw-threaded portion, and a staple, one leg of which extends through registering openings in said nut and said screw-threaded portion, the other leg of said staple extending through an opening in the head of said bolt.

In testimony whereof I affix my signature in presence of two witnesses.

WILLIAM H. SHUTER.

Witnesses:
JOSEPH C. DEVICK,
GEORGE L. CHINDAHL.

---

Copies of this patent may be obtained for five cents each, by addressing the "Commissioner of Patents, Washington, D. C."